US008040642B2

(12) United States Patent
de Rooij et al.

(10) Patent No.: US 8,040,642 B2
(45) Date of Patent: Oct. 18, 2011

(54) SMART CAPACITOR

(75) Inventors: Michael Andrew de Rooij, Sparks, NV (US); Karim Younsi, Ballston Lake, NY (US); Daniel Qi Tan, Niskayuna, NY (US); Richard S. Zhang, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 384 days.

(21) Appl. No.: 12/433,058

(22) Filed: Apr. 30, 2009

(65) Prior Publication Data
US 2010/0277836 A1    Nov. 4, 2010

(51) Int. Cl.
*H02H 3/18* (2006.01)
(52) U.S. Cl. .......................................... 361/15; 361/86
(58) Field of Classification Search ..................... 361/15, 361/86, 87
See application file for complete search history.

(56) References Cited

U.S. PATENT DOCUMENTS

| | | | |
|---|---|---|---|
| 3,735,250 A | 5/1973 | Masui | |
| 6,064,857 A | 5/2000 | Wiedeman et al. | |
| 6,668,233 B1 * | 12/2003 | Sarfert et al. | 702/63 |
| 2003/0103301 A1 | 6/2003 | Fechner | |
| 2008/0200748 A1 * | 8/2008 | Testani et al. | 600/13 |

FOREIGN PATENT DOCUMENTS

| | | |
|---|---|---|
| JP | 10261551 A | 9/1998 |
| JP | 2005168261 A | 6/2005 |

OTHER PUBLICATIONS

Ramm, G.; Moser, H., Calibration of electronic capacitance and dissipation factor bridges, Instrumentation and Measurement, IEEE Transactions on, vol. 52, Issue 2, Apr. 2003, pp. 396-399.
Venet, P.; Perisse, F.; El-Husseini, M.H.; Rojat, G., Realization of a smart electrolytic capacitor circuit, Industry Applications Magazine, IEEE, vol. 8, Issue 1, Jan./Feb. 2002, pp. 16-20.
JP10261551(A) English Abstract.
JP2005168261(A) English Abstract.

* cited by examiner

*Primary Examiner* — Danny Nguyen
(74) *Attorney, Agent, or Firm* — Ann M. Agosti

(57) ABSTRACT

A smart capacitor includes a main capacitor having at least one intelligence mechanism selected from a prognostics mechanism and a high speed protection mechanism integrated within the main capacitor. The at least one intelligence mechanism and the main capacitor are together configured to generate at least one type of output signal selected from long term induced failure mechanism signals and sudden capacitor failure condition signals in response to desired input signals.

22 Claims, 3 Drawing Sheets

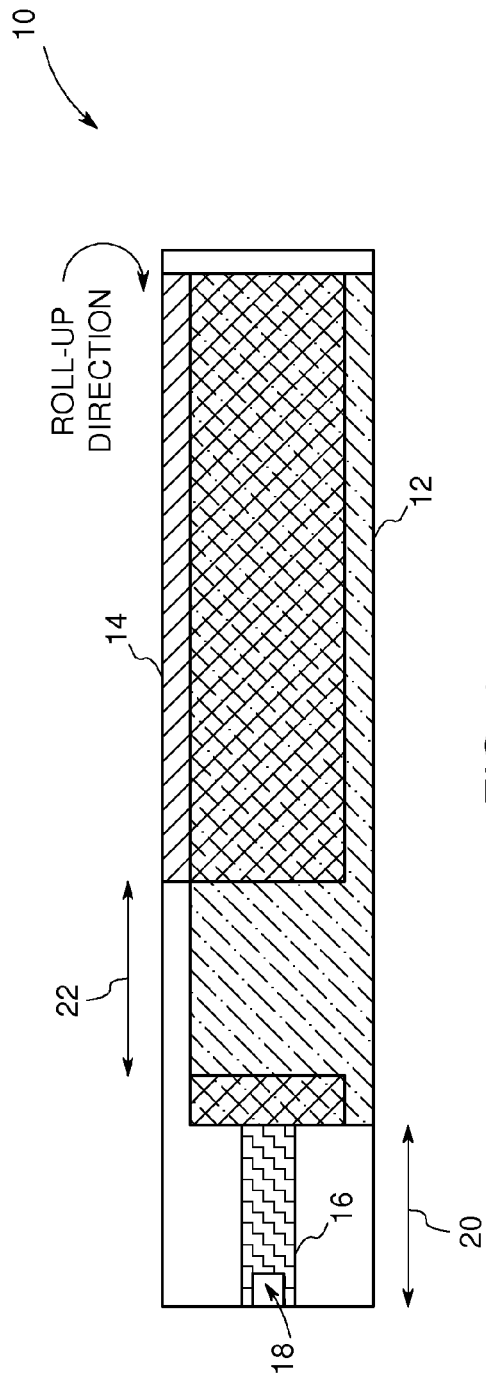
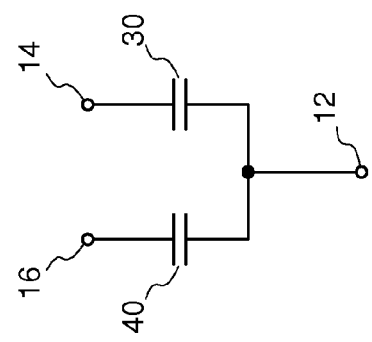
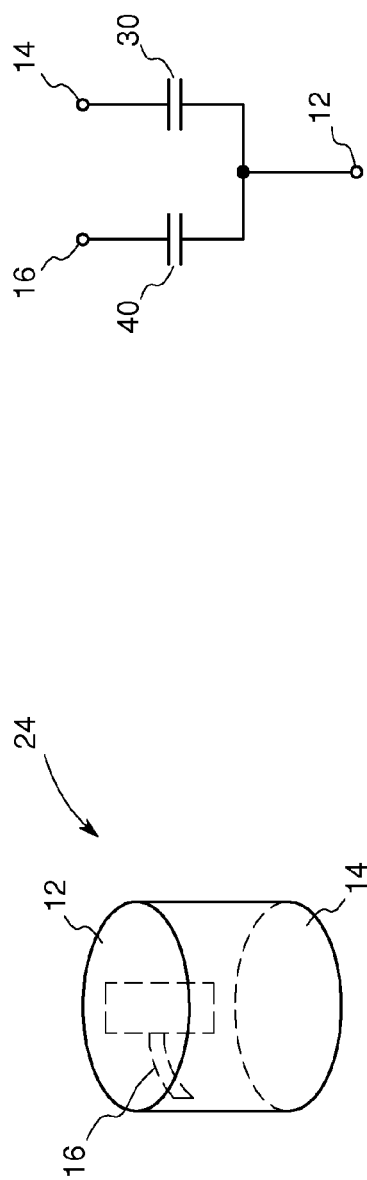

SMART CAPACITOR

BACKGROUND

The invention relates generally to smart capacitors and more particularly to high energy density capacitors and a method for integrating one or both of prognostics and protection mechanisms into high energy density capacitors to implement smart capacitors without significantly impacting the energy density or performance.

Capacitors are traditionally the least reliable component in power electronic systems. Microscopic changes in the capacitor's dielectric material and conductor over its working life, induced by high voltage(s), high current transients (di/dt's), temperature, temperature cycling and humidity can lead to reduced performance and accelerate the time to failure and/or system failure to which the capacitor(s) is/are attached. High performance applications, such as military applications, can accelerate this process. Maintaining maximum operational capability of the system for most applications is highly desirable.

Providing prognostics and/or protection within a capacitor can reduce system failures and increase operational capabilities of the system(s) to which the capacitor is attached. Prognostics can be used to detect long term induced failure mechanisms and high speed protection can be used to protect the system in the event of a sudden capacitor failure caused by conditions that can lead to capacitor failure.

In view of the foregoing, it would be advantageous to provide a high energy density capacitor structure having prognostics and/or high speed protection mechanisms integrated therein, and a method for integrating one or both prognostics and high speed protection into high energy density capacitors without significantly impacting the energy density or performance.

BRIEF DESCRIPTION

Briefly, in accordance with one embodiment, a smart capacitor comprises:

a main capacitor; and at least one intelligence mechanism selected from a reference capacitor prognostics mechanism and a high speed protection mechanism integrated within the high energy density capacitor, wherein the at least one intelligence mechanism and the main capacitor are together configured to generate at least one type of output signal selected from long term induced failure mechanism signals and sudden capacitor failure condition signals in response to desired input signals.

DRAWINGS

These and other features, aspects, and advantages of the present invention will become better understood when the following detailed description is read with reference to the accompanying drawings in which like characters represent like parts throughout the drawings, wherein:

FIG. 1 is a two-dimensional diagram illustrating an unrolled view of a capacitor structure according to one embodiment of the invention;

FIG. 2 is a three-dimensional view illustrating the unrolled capacitor structure depicted in FIG. 1 when fully assembled;

FIG. 3 is a circuit diagram depicting an equivalent circuit corresponding to the fully assembled capacitor shown in FIG. 2;

Figure 4:
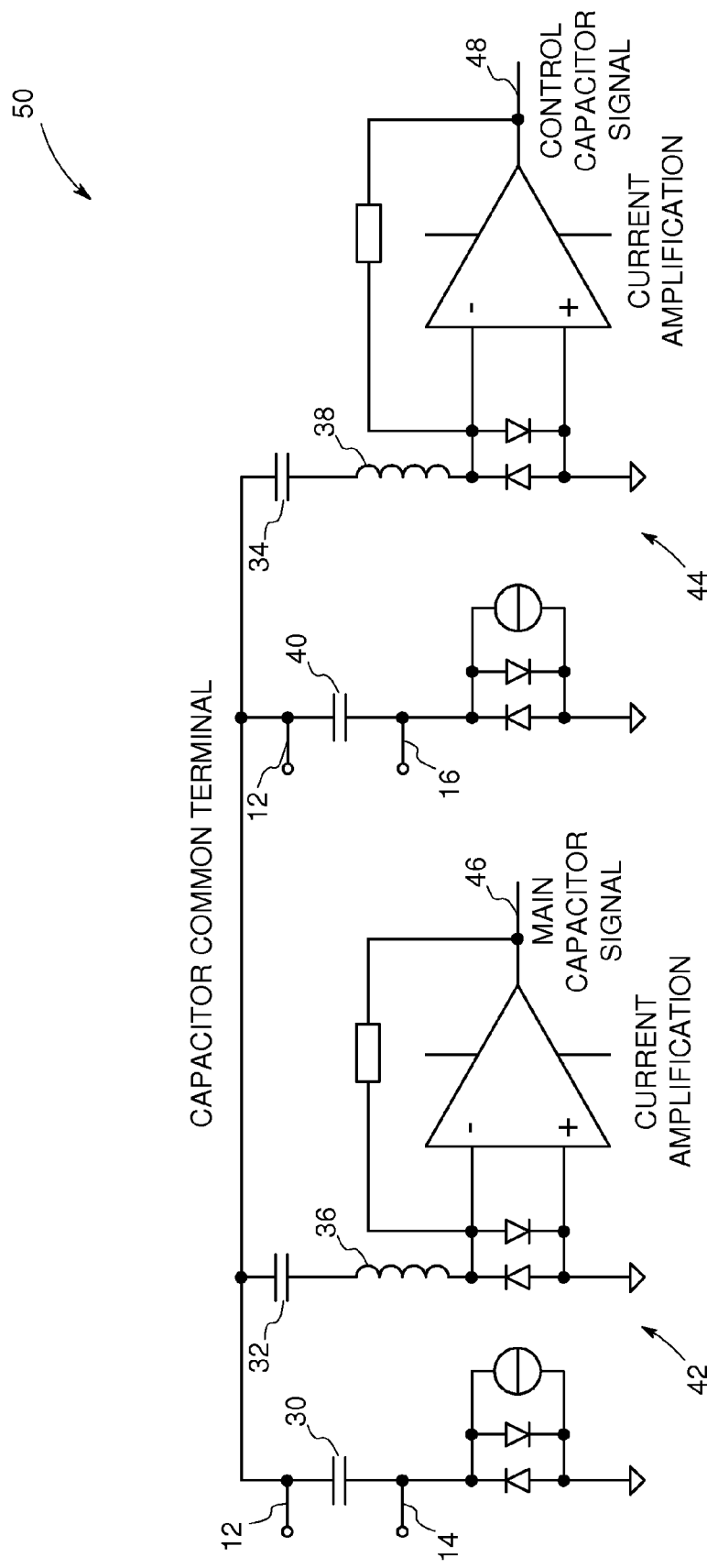
Figure 5:
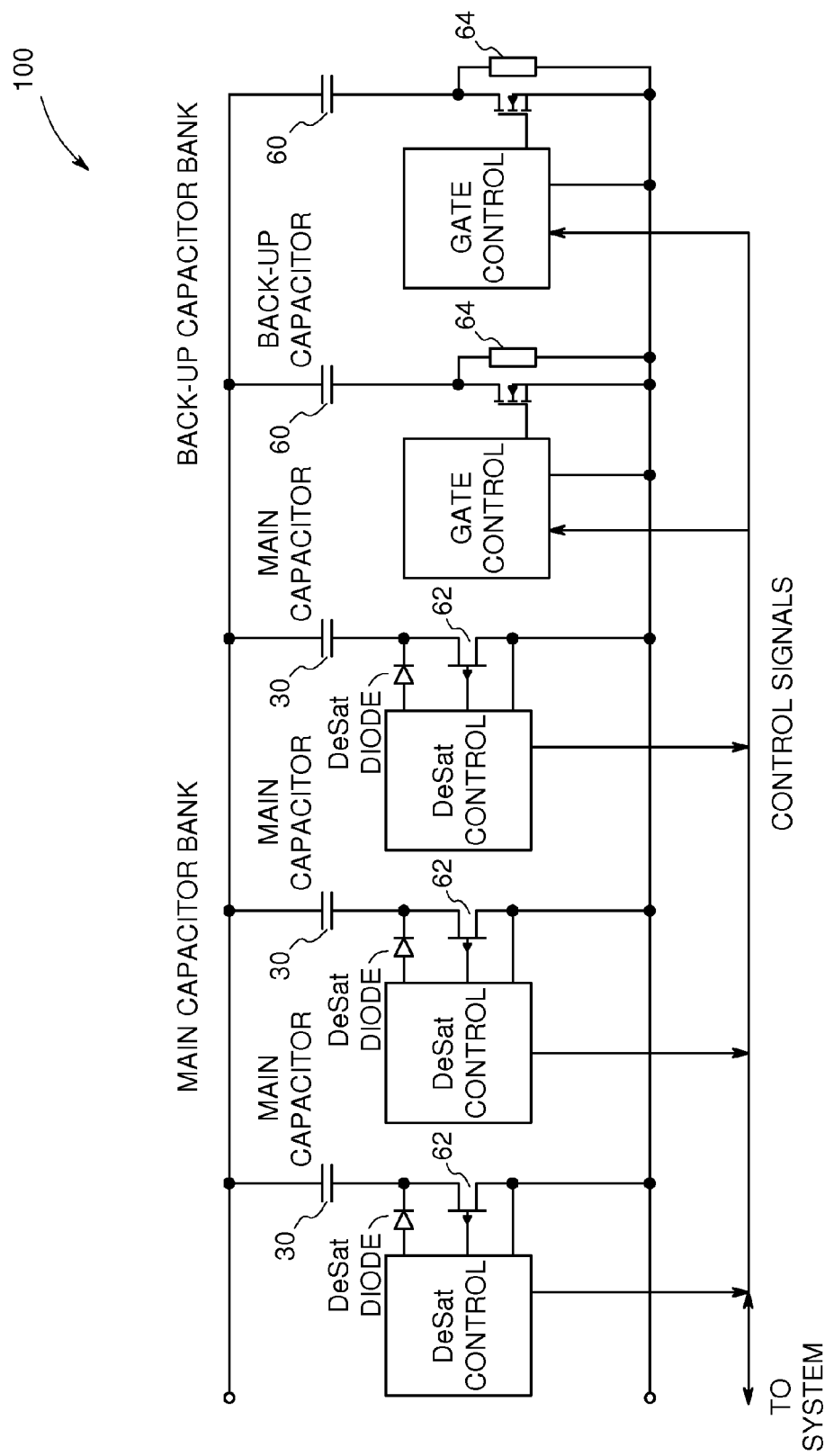

FIG. 4 is a circuit diagram illustrating a main capacitor and a corresponding sense capacitor combined with processing circuits to determine electrically induced aging effects of the main capacitor using the sense capacitor as a reference, according to one embodiment of the invention; and FIG. 5 is a system block diagram illustrating main and back-up capacitor banks using a plurality of smart capacitors in a matrix interconnect system configuration, according to one embodiment of the invention.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Realizing that capacitor life and internal and external faults can be predicted and detected through measurements of capacitance degradation and loss factor, the present inventors recognized this function can be implemented according to one aspect by integrating a sense capacitor of the same type into a main capacitor and configuring the resultant capacitor such that the integrated sense capacitor is not subjected to any of the electrical stresses seen by the main capacitor.

It is noted that temperature and thermal cycling induced failure modes that are common to both the sense capacitor and the main capacitor can be detected by integrating a negative temperature coefficient (NTC) resistor or thermal couple into the main capacitor. It is also noted the sense capacitor can be designed with a capacitance value several orders of magnitude lower than the main capacitor and to share a common terminal with the main capacitor.

Looking now at FIG. 1, a two-dimensional diagram illustrates an unrolled layout view of a capacitor structure 10 according to one embodiment of the invention. The capacitor structure 10 includes a common terminal 12, a main terminal 14, and a sense terminal 16 comprising a solder pad 18. The capacitor structure 10 further includes a first isolation zone 20 and a second isolation zone 22.

FIG. 2 is a three-dimensional view illustrating a fully assembled capacitor 24 that employs the unrolled structure 10 depicted in FIG. 1 to implement a main capacitor and a sense capacitor integrated therein. Capacitor 24 can be seen to include the common terminal 12, main terminal 14, and sense terminal 16 for providing external connection points for the corresponding main capacitor and sense capacitor.

FIG. 3 is a circuit diagram depicting an equivalent circuit corresponding to the fully assembled capacitor 24 shown in FIG. 2. The equivalent circuit shows that fully assembled capacitor 24 comprises both a main capacitor 30 connected to both the common terminal 12 and the main terminal 14, and a sense capacitor 40 connected to both the common terminal 12 and the sense terminal 16. According to some embodiments, the sense capacitor 40 can be integrated into the same layers comprising the main capacitor 30, or alternatively can be disposed between the main capacitor layers and made porous with respect to the main capacitor 30.

According to one aspect, low magnitude, high frequency signals can be injected into both the main capacitor 30 and the sense capacitor 40. Any differences between measured feedback signals via integrated prognostic electronics will reflect the degradation, if any, of the main capacitor 30. Such integrated prognostic electronics can derive its power by, for example, scavenging power from the main capacitor, or for example, by the corresponding system that employs the capacitor 24 through a signal cable such as depicted in FIG. 5, described in detail below. Further, external faults may be detected using the same circuits simply by detecting abnormal current transients (di/dt's) that do not coincide with trigger signals to the system.

The present inventors recognized that a sense capacitor of the same type can be integrated into the main capacitor that is not subjected to any electrical stresses of the main capacitor and employed in combination with prognostics and/or high speed protection mechanisms integrated therein to predict and detect capacitor life and internal and external capacitor faults through measurements of degradation of the corresponding capacitance and loss factor.

FIG. 4 illustrates a smart capacitor assembly 50 including a main capacitor 30 and a corresponding sense capacitor 40 combined with processing circuits 42, 44 to determine electrically induced aging effects of the main capacitor 30 using the sense capacitor 40 as a reference, according to one embodiment of the invention. According to one aspect, the sense capacitor 40 has a capacitance value several orders of magnitude (at least three) lower than the main capacitor 30 and shares a common terminal 12 with the main capacitor 30.

According to one aspect, low magnitude, high frequency signals are injected into the sense capacitor 40 via terminals 12, 16 and into the main capacitor 30 via terminals 12, 14. Feedback signals are measured at corresponding processing circuit output terminals 46, 48. The difference between the respective feedback signals generated via corresponding processing circuits 42, 44 reflects the degradation of the main capacitor 30. The processing (prognostic) electronics 42, 44 can derive the requisite power by any suitable means, including without limitation, by either scavenging from the main capacitor 30, or provided by the corresponding system through respective signal cables, as stated above. It is noted that external faults can be detected using the same processing circuits 42, 44 by detecting abnormal di/dt's that do not coincide with trigger signals to the corresponding system that employs the smart capacitor 50.

The prognostics mechanism signal processing circuits 42, 44 are configured according to one embodiment to provide capacitor information selected from capacitance value, loss tangent, and changes in capacitor characteristics with respect to time. Embodied processing circuits 42, 44 can be seen to include corresponding DC blocking capacitors 32, 34. These DC blocking capacitors 32, 34 are each connected in series with a corresponding detuning inductor 36, 38 that is configured to detune the voltage blocking capacitor effects at a desired sense frequency and enhance measurement accuracy.

FIG. 5 is a protection system 100 block diagram illustrating main and back-up capacitor banks using a plurality of main capacitors 30 and back-up capacitors 60 in a matrix interconnect system configuration, according to one embodiment of the invention. The protection system 100 can disconnect the defective capacitor(s) 30 and connect a back up capacitor(s) 60 in place of the defective capacitor(s) 30.

The protection system 100 circuits can be integrated into the main capacitor(s) 30 and the back-up capacitor(s) 60 using high temperature active power switches such as, but not limited to, normally-off type SiC MOSFETs 64 connected to the back-up capacitor(s) 60 and normally-on type SiC JFETs 62 connected to the main capacitor(s) 30. Upon detection of end of life and/or internal and external faults, the faulty capacitor(s) 30 can be disconnected by turning off its corresponding SiC JFET 62 and by connecting a back-up capacitor 60 by turning on its corresponding SiC MOSFET 64.

The SiC switches 62, 64 can be integrated with the main and back-up capacitors 30, 60, as stated above. This integrated structure maximizes modularity, adaptability and recoverability of capacitors for different applications by allowing the main and back-up capacitors 30, 60 to operate in a reconfigurable matrix format.

According to one embodiment, the integrated fault isolation active power electronics can be implemented as a planar disk with the contact area being identical to the main capacitor 30 terminal 14 as seen in FIG. 2. The resultant planarity and low profile of the fault isolation power electronics will also aid thermal management of both the capacitor(s) 30, 60 and the corresponding integrated circuits. Power for the control electronics can be provided, without limitation, by scavenging from energy stored in the corresponding capacitor(s) 30, 60, or provided by the system that employs the protection system 100 through an error signal. It is noted that the choice of a JFET will enable the protection system 100 to function with reduced capability in the event of loss of supply power.

In summary explanation, embodiments of smart capacitors and systems that employ smart capacitors have been described herein. These smart capacitors can employ one or both prognostics and protection circuits integrated therein to measure and detect aging effects of the capacitors during operation and to provide system protection against sudden capacitor failures. According to one aspect, the protection circuits are integrated into a main capacitor terminal. A sense capacitor integrated inside the main capacitor operates in combination with the prognostic circuits to provide capacitance and loss factor information.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A smart capacitor comprising:
a main capacitor; and
at least one intelligence mechanism selected from a reference capacitor prognostics mechanism and a high speed protection mechanism integrated within the main capacitor, wherein the at least one intelligence mechanism and the main capacitor are together configured to generate at least one type of output signal selected from long term induced failure mechanism signals and sudden capacitor failure condition signals in response to desired input signals.

2. The smart capacitor according to claim 1, wherein the main capacitor is a high energy density capacitor.

3. The smart capacitor according to claim 1, wherein the reference capacitor prognostics mechanism comprises a reference capacitor having a capacitance value at least three orders of magnitude smaller than the main capacitor.

4. The smart capacitor according to claim 3, wherein the reference capacitor is integrated into the same layers comprising the main capacitor.

5. The smart capacitor according to claim 3, wherein the reference capacitor is disposed between the main capacitor layers and is porous with respect to the main capacitor.

6. The smart capacitor according to claim 3, wherein the reference capacitor shares a common terminal with the main capacitor.

7. The smart capacitor according to claim 1, wherein the prognostics mechanism comprises a signal processing circuit configured to provide capacitor information selected from capacitance value, loss tangent, and changes in capacitor characteristics with respect to time.

8. The smart capacitor according to claim 7, wherein the signal processing circuit comprises a voltage blocking capacitor configured to provide high voltage sense capacitor operation associated with the prognostics mechanism.

9. The smart capacitor according to claim 8, wherein the blocking capacitor is connected in series with a detuning inductor that is configured to detune voltage blocking capacitor effects at a desired sense frequency and further configured to enhance measurement accuracy.

10. The smart capacitor according to claim 1, wherein the high speed protection mechanism is integrated into desired capacitor terminals associated with the main capacitor.

11. The smart capacitor according to claim 1, wherein the high speed protection mechanism comprises at least one power semi-conductor device configured to operate as a fault sensor.

12. The smart capacitor according to claim 11, wherein the at least one power semi-conductor device comprises a normally on SiC JFET.

13. The smart capacitor according to claim 12, wherein the SiC JFET is configured to operate in a protection mode in the absence of control supply power.

14. The smart capacitor according to claim 1, wherein the high speed protection mechanism comprises a back-up capacitor.

15. The smart capacitor according to claim 14, wherein the back-up capacitor comprises a SiC MOSFET.

16. The smart capacitor according to claim 1, wherein the high speed protection mechanism comprises a plurality of capacitors in a capacitor bank.

17. The smart capacitor according to claim 1, wherein the high speed protection mechanism comprises a multiple capacitor back-up capacitor bank.

18. The smart capacitor according to claim 1, wherein the high speed protection mechanism comprises a main capacitor bank and a back-up capacitor bank, wherein the number of capacitors in the main capacitor bank is different from the number of capacitors in the back-up capacitor bank, and further wherein the main capacitor bank and the back-up capacitor bank are configured in a reconfigurable matrix structure.

19. The smart capacitor according to claim 1, wherein the prognostic mechanism is powered through a power scavenger connected to the main capacitor.

20. The smart capacitor according to claim 1, wherein the prognostic mechanism is powered through an information cable connecting a control system to the smart capacitor.

21. The smart capacitor according to claim 1, wherein the high speed protection mechanism is powered through a power scavenger connected to the main capacitor.

22. The smart capacitor according to claim 1, wherein the high speed protection mechanism is powered through an information cable connecting a control system to the smart capacitor.

* * * * *